United States Patent
Lee et al.

(10) Patent No.: US 10,712,869 B2
(45) Date of Patent: Jul. 14, 2020

(54) TOUCH PANEL CONTROLLER FOR SENSING CHANGE IN CAPACITANCE

(71) Applicant: SAMSUNG ELECTRONICS CO., LTD., Suwon-si, Gyeonggi-Do (KR)

(72) Inventors: Jin Chul Lee, Seoul (KR); Choong Hoon Lee, Seoul (KR); Cha Dong Kim, Gwacheon-si (KR); Jun Chul Park, Daegu (KR); Dong Wook Lim, Seoul (KR); Yoon Kyung Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 100 days.

(21) Appl. No.: 15/680,108

(22) Filed: Aug. 17, 2017

(65) Prior Publication Data

US 2018/0121020 A1 May 3, 2018

(30) Foreign Application Priority Data

Nov. 2, 2016 (KR) ........................ 10-2016-0145100

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 2203/04103–04113
See application file for complete search history.

(56) References Cited

U.S. PATENT DOCUMENTS

| 8,976,145 | B2 | 3/2015 | Taylor et al. |
| 9,007,343 | B1 | 4/2015 | Ludden |
| 9,207,802 | B2 | 12/2015 | Um |
| 9,430,105 | B2 | 8/2016 | Yao et al. |
| 9,465,482 | B2 | 10/2016 | Ludden |
| 2011/0031042 | A1* | 2/2011 | Wu .................. G06F 3/0412 178/18.06 |
| 2011/0210938 | A1 | 9/2011 | Kuang et al. |
| 2012/0218222 | A1 | 8/2012 | Shen et al. |
| 2014/0145997 | A1* | 5/2014 | Tiruvuru ............ G06F 3/044 345/174 |
| 2014/0176489 | A1 | 6/2014 | Park |
| 2014/0253491 | A1* | 9/2014 | Kwon ................ G06F 3/044 345/174 |
| 2015/0268783 | A1* | 9/2015 | Yoon ................ G06F 3/0414 345/173 |
| 2016/0098117 | A1 | 4/2016 | Ouh et al. |
| 2016/0147370 | A1 | 5/2016 | Mohindra |
| 2016/0239147 | A1* | 8/2016 | Wang ................ G06F 3/0416 |
| 2016/0364081 | A1 | 12/2016 | Ludden |

FOREIGN PATENT DOCUMENTS

KR 1020130067101 A 6/2013

\* cited by examiner

*Primary Examiner* — Sanghyuk Park
(74) *Attorney, Agent, or Firm* — Volentine, Whitt & Francos, PLLC

(57) ABSTRACT

A touch panel controller includes a signal driver charging a plurality of sensor lines extending in a direction with the same charge, by applying a driving signal to one sensor line of sensor lines and applying a mirrored driving signal mirrored from the driving signal to the remaining sensor lines of the sensor lines, and a sensor sensing a change in capacitance from the sensor lines, respectively.

20 Claims, 10 Drawing Sheets

TOUCH PANEL CONTROLLER FOR SENSING CHANGE IN CAPACITANCE

CROSS-REFERENCE TO RELATED APPLICATION(S)

Korean Patent Application No. 10-2016-0145100, filed on Nov. 2, 2016, in the Korean Intellectual Property Office, and entitled: "Touch Panel Controller" is incorporated by reference in its entirety.

BACKGROUND

1. Field

The present disclosure relates to a touch panel controller.

2. Description of Related Art

Capacitive touchscreen devices commonly include a plurality of electrodes formed to have predetermined patterns. Touchscreen devices may calculate coordinates of touch inputs by generating changes in self-capacitance or mutual-capacitance by touch inputs, using a plurality of electrodes. In a self-capacitance sensing method, a small change in capacitance may be effectively detected, but since the capacitance of the plurality of electrodes themselves is relatively great as compared to that in a mutual-capacitance sensing method, capacitance of electrodes themselves is required to be removed. In addition, in order to precisely determine touch inputs, a capacitance offset between a plurality of electrodes is required in order to compensate therefor.

SUMMARY

An aspect of embodiments may provide a touch panel controller in which capacitance of electrodes in a touch panel may be removed and a capacitance offset between electrodes may be compensated.

According to an aspect of embodiments, a touch panel controller includes a driving unit charging a plurality of sensor lines with the same charge by simultaneously applying a driving signal to the sensor lines extending in a direction. A sensing unit senses a change in capacitance from the sensor lines, respectively.

According to another aspect of embodiments, a touch panel controller includes a driving unit applying a driving signal to a plurality of sensor lines extending in a direction. A sensing unit senses a change in capacitance by calculating a difference in voltage levels between a voltage of each of the sensor lines and a voltage of the driving signal.

According to another aspect of embodiments, a touch panel controller includes a signal driver that applies a first driving signal to a plurality of sensor lines of a touch panel. A sensor senses, for each of the sensor lines, a difference between a voltage sensed on the sensor line and a voltage of the first driving signal.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, example embodiments will be described with reference to the accompanying drawings.

Figure 1:
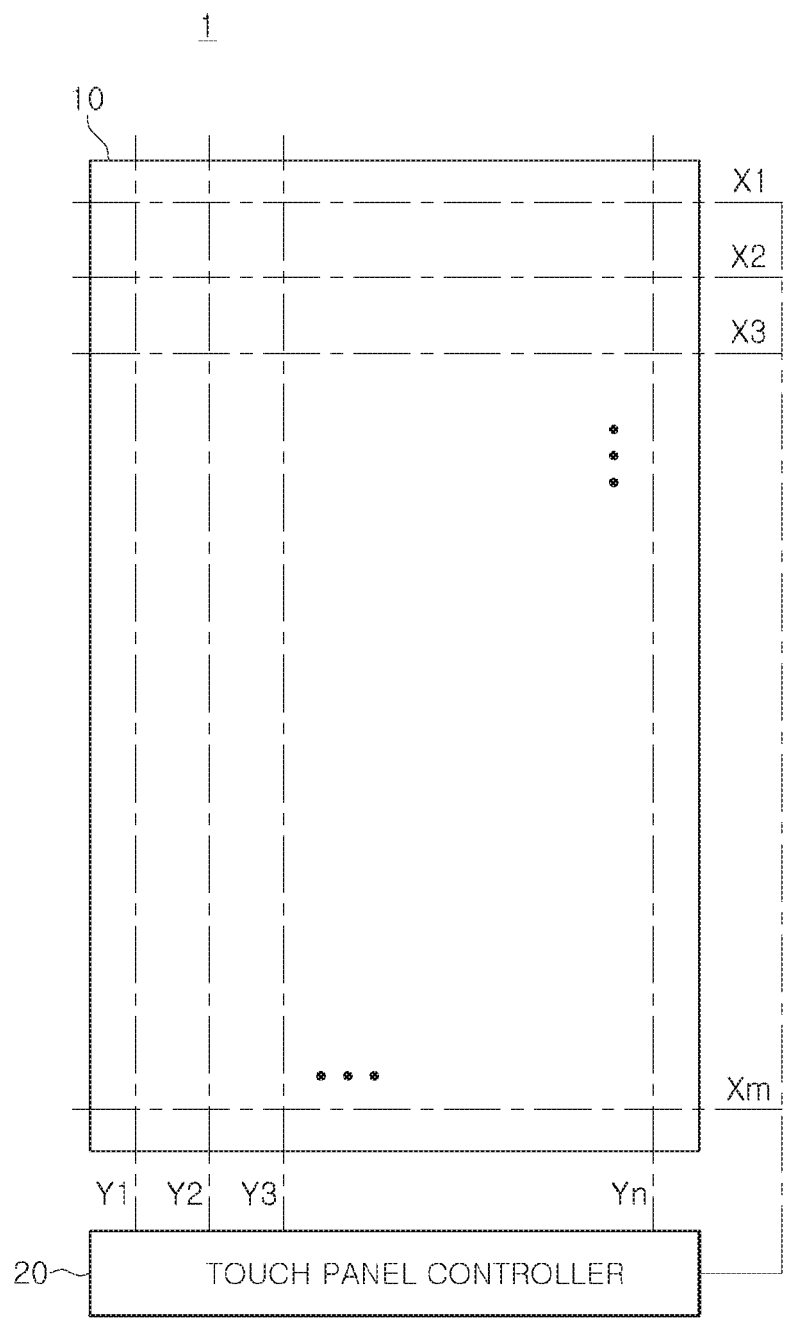
FIG. 1 illustrates a block diagram of a touchscreen device according to an example embodiment of the present disclosure.

FIG. 1 illustrates a block diagram of a touchscreen device according to an example embodiment.

Referring to FIG. 1, a touchscreen device 1 according to an example embodiment may include a touch panel 10 and a touch panel controller 20 driving the touch panel 10.

The touch panel 10 may include a plurality of first sensor lines X1 to Xm extending in a first direction and a plurality of second sensor lines Y1 to Yn extending in a second direction.

The touch panel controller 20 may provide driving signals to the first sensor lines X1 to Xm and the second sensor lines Y1 to Yn of the touch panel 10, and may sense capacitance from the first sensor lines X1 to Xm and the second sensor lines Y1 to Yn. A capacitance sensing method may include a self-capacitance sensing method and a mutual-capacitance sensing method. The self-capacitance sensing method may be a method in which capacitance is sensed from a sensor line to which a driving signal is applied. Herein, each of the first sensor lines X1 to Xm and the second sensor lines Y1 to Yn of the touch panel 10 is used as the sensor line. The mutual-capacitance sensing method may be a method in which a driving signal is applied to one of the first sensor lines X1 to Xm and the second sensor lines Y1 to Yn, and capacitance formed between sensor lines extending in different directions is sensed from the other thereof.

The touch panel controller 20 according to an example embodiment may use a self-capacitance sensing method. For example, when a user touch is input to a specific position of the touch panel 10, the touch panel controller 20 may detect a change in capacitance sensed by the first sensor lines X1 to Xm and a change in capacitance sensed by the second sensor lines Y1-Yn, respectively, to thus detect a touch position.

Figure 2:
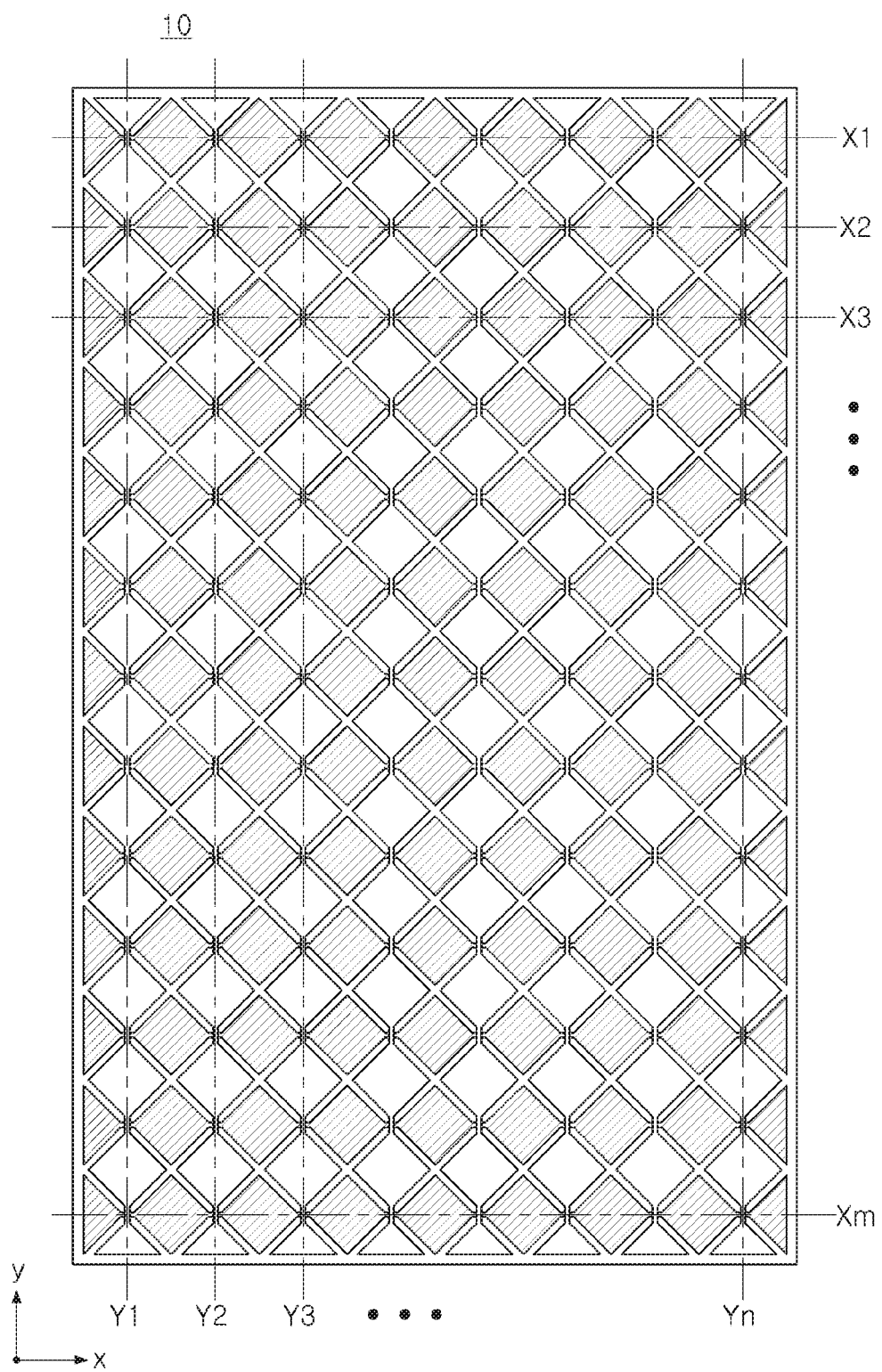
FIG. 2 illustrates a view illustrating an example of a touch panel according to an example embodiment of the present disclosure.

FIG. 2 illustrates a view illustrating an example of a touch panel according to an example embodiment.

With reference to FIG. 2, a touch panel 10 may include a substrate 11 (illustrated in FIG. 3), first sensor lines X1 to Xm and second sensor lines Y1 to Yn provided on the substrate 11. In addition, the touch panel 10 may further include a VCOM plate 12 (illustrated in FIG. 3). The VCOM plate 12 may provide the touch panel controller 20 with a predetermined reference voltage. The VCOM plate 12 may be connected to a VSS voltage (illustrated in FIG. 3), and in one example, the VSS voltage may include a ground voltage. In addition, the VCOM plate 12 may be connected to a cathode of a battery of a mobile device including a touch-screen device.

The first sensor lines X1 to Xm may each be extended in a first direction, an x-axis direction, and the second sensor lines Y1 to Yn may each be extended in a second direction perpendicular to the first direction, for example, in a y-axis direction.

The first sensor lines X1 to Xm and the second sensor lines Y1 to Yn may respectively have a diamond-shaped pattern. In addition, the first sensor lines X1 to Xm and the second sensor lines Y1 to Yn may respectively have various polygonal patterns, such as a rectangular pattern, a triangular pattern, and the like.

The first sensor lines X1 to Xm and the second sensor lines Y1 to Yn may respectively be formed of a material, such as indium-tin oxide (ITO), indium zinc oxide (IZO), zinc oxide (ZnO), carbon nanotubes (CNT), or graphene, having electric conductivity, and may be configured by a mesh-type conductor line manufactured of one or silver (Ag), aluminum (Al), chromium (Cr), nickel (Ni), molybdenum (Mo), and copper (Cu), or alloys thereof.

The first sensor lines X1 to Xm and the second sensor lines Y1 to Yn may be arranged in a substrate 11 disposed between a lower substrate including a pixel array and an upper substrate such as a glass substrate within the touchscreen device 1. The substrate 11 may be formed of a material, such as a film of polyethylene terephthalate (PET), polycarbonate (PC), polyethersulfone (PES), polyimide (PI), polymethlymethacrylate (PMMA), cycloolefin polymers (COP) or the like, soda glass, or tempered glass, to have a relatively high degree of light transmittance. The first sensor lines X1 to Xm and the second sensor lines Y1 to Yn may be provided on one surface or two surfaces of the substrate 11. In addition, the first sensor lines X1 to Xm and the second sensor lines Y1 to Yn may be provided on different substrates 11 to intersect each other. Further, for example, when the first sensor lines X1 to Xm and the second sensor lines Y1 to Yn are all provided on one surface of the substrate 11, a predetermined insulating layer may be partially formed at intersection areas of the first sensor lines X1 to Xm and the second sensor lines Y1 to Yn.

According to an example embodiment, in the case of a cover window integrated-type touch panel, the first sensor lines X1 to Xm and the second sensor lines Y1 to Yn may be formed by patterning an electrode deposited on a cover window, and in the case of a display integrated touch panel, the first sensor lines X1 to Xm and the second sensor lines Y1 to Yn may be formed by patterning an electrode on a display itself.

Since the touch panel controller 20 according to an example embodiment senses capacitance using a self-capacitance sensing method, the first sensor lines X1 to Xm and the second sensor lines Y1 to Yn are thus used as sensor lines. Therefore, a driving signal may be respectively applied to the first sensor lines X1 to Xm and the second sensor lines Y1 to Yn, and the capacitance may be independently detected from a sensor line to which the driving signal is applied.

Figure 3:
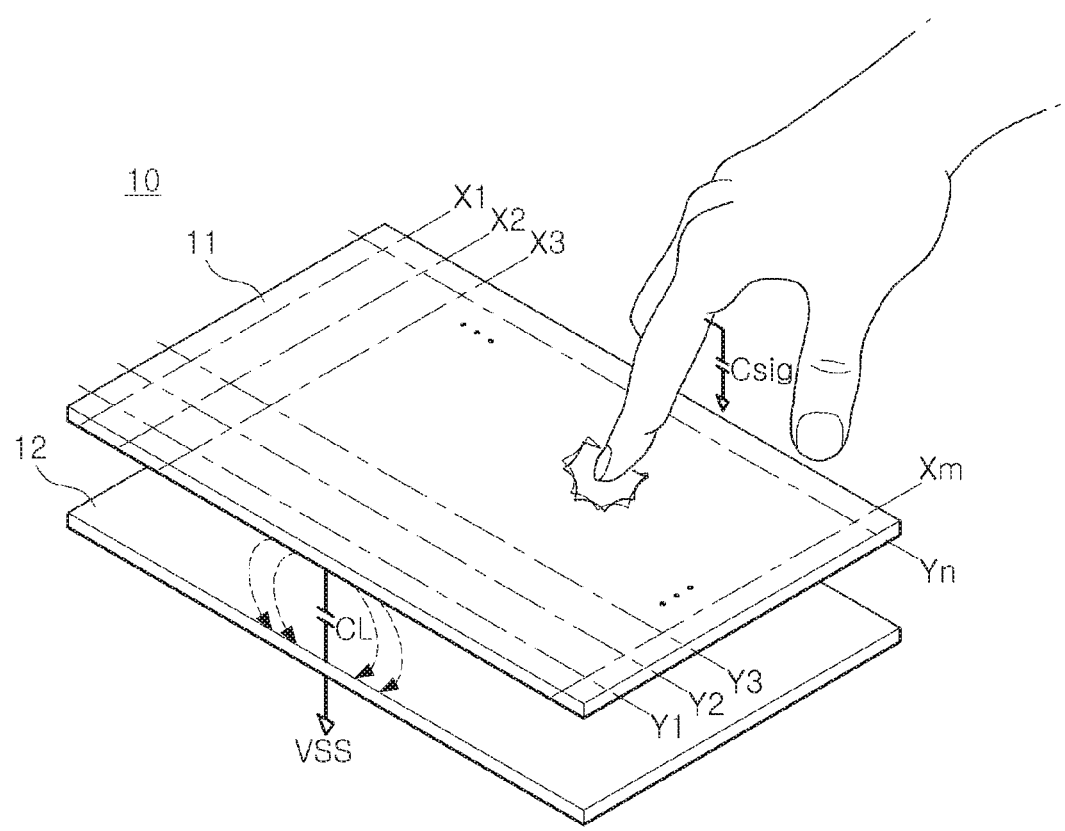
FIG. 3 illustrates a diagram conceptually illustrating capacitance of a touch panel.

FIG. 3 illustrates a diagram conceptually illustrating capacitance of a touch panel.

With reference to FIG. 3, the substrate 11 on which the first sensor lines X1 to Xm and the second sensor lines Y1 to Yn are provided, and a VCOM plate 12 may be spaced apart from each other with a predetermined interval therebetween. Capacitance CL of a sensor line component by the first and second sensor lines X1 to Xm and Y1 to Yn of the touch panel 10 may be formed between the first and second sensor lines X1 to Xm and Y1 to Yn and the VCOM plate 12. In addition, for example, when a touch object such as a finger touches the touch panel 10, capacitance Csig of a signal component applied to the first and second sensor lines X1 to Xm and Y1 to Yn may be further generated between the first and second sensor lines X1 to Xm and Y1 to Yn and the touch object.

The touch panel controller 20 may sense a change in capacitance between the capacitance CL of the sensor line component and the capacitance Csig of the signal component, to thus determine the presence or absence of a touch and the position of a touch. However, the capacitance CL of the sensor line component may not be a uniform level of capacitance in the entirety of the touch panel 10, and deviations may occur in areas and lengths of the first and second sensor lines X1 to Xm and Y1 to Yn, and the like, due to a process error in manufacturing the first and second sensor lines X1 to Xm and Y1 to Yn. Thus, an offset due to a difference between capacitance of a specific sensor line and capacitance of a different sensor line may occur. Since such an offset may interfere with detection of a minute change in capacitance, such as a hover touch, a capacitance offset corresponding to a difference in capacitance between the first and second sensor lines X1 to Xm and Y1 to Yn should be removed.

Figure 4:
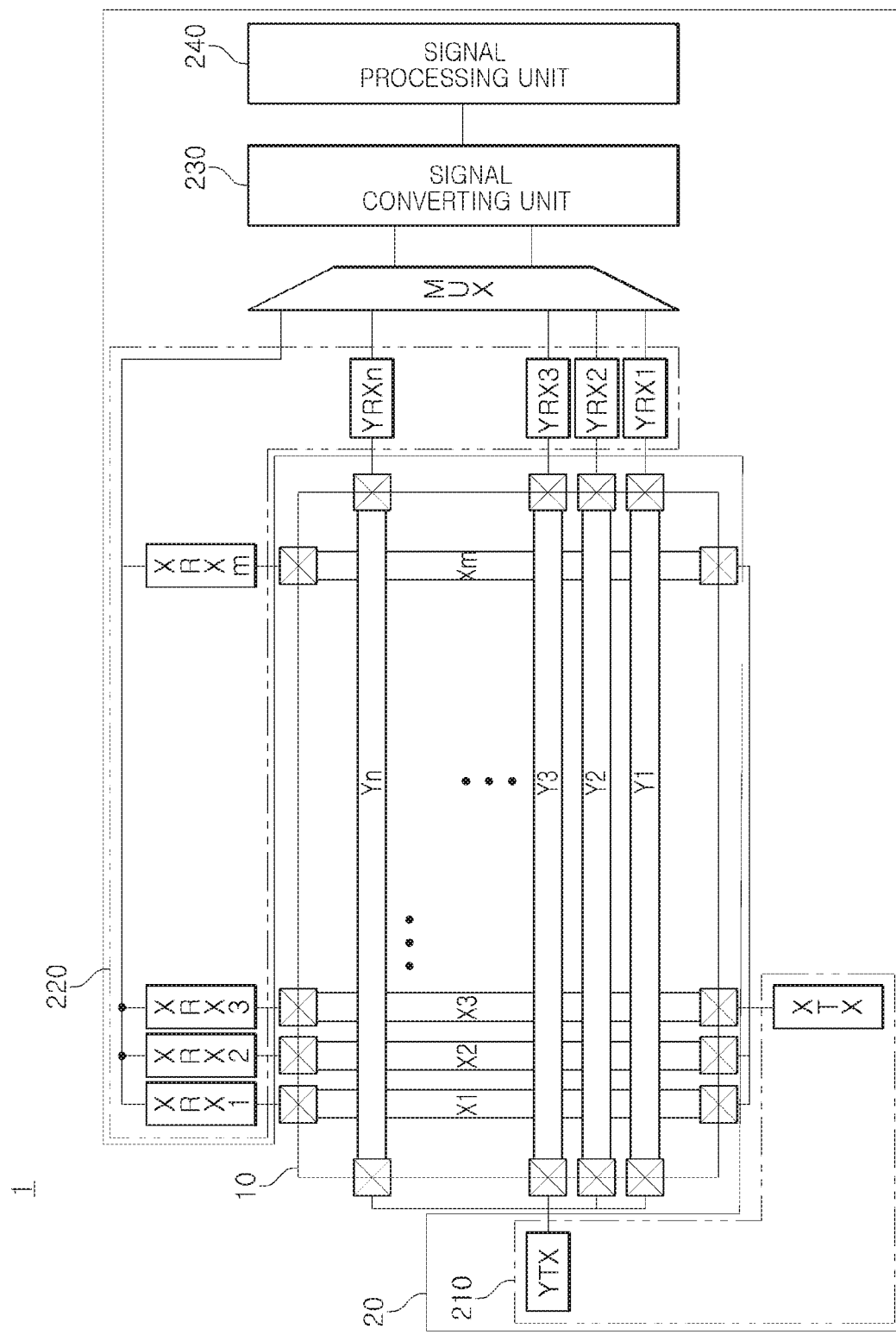
FIG. 4 illustrates a block diagram of a touchscreen device according to an example embodiment of the present disclosure.

FIG. 4 illustrates a block diagram of a touchscreen device according to an example embodiment.

With reference to FIG. 4, the touch panel controller 20 may include a driving unit 210, a sensing unit 220, a signal converting unit 230, and a signal processing unit 240.

The driving unit 210 may include a plurality of transmitters XTX and YTX, and the transmitters XTX and YTX may generate a driving signal and may provide the generated driving signal to the first and second sensor lines X1 to Xm and Y1 to Yn. The transmitters XTX and YTX may be provided as a first transmitter XTX and a second transmitter YTX, respectively. The first transmitter XTX may provide a driving signal to the first sensor lines X1 to Xm and the second transmitter YTX may provide a driving signal to the second sensor lines Y1 to Yn.

The first sensor lines X1 to Xm may be simultaneously charged by the first transmitter XTX, and the second sensor lines Y1 to Yn may be simultaneously charged by the second transmitter YTX. The first transmitter XTX and the second transmitter YTX may operate at the same timing, or may operate at different timings. For example, in the case in which the first transmitter XTX and the second transmitter YTX operate at different timings, a single transmitter may be provided to provide a driving signal to the first and second sensor lines X1 to Xm and Y1 to Yn using a switching circuit at different timings.

The sensing unit 220 may include a plurality of receivers XRX1 to XRXm and YRX1 to YRXn. The plurality of receivers XRX1 to XRXm and YRX1 to YRXn may detect capacitance from the first and second sensor lines X1 to Xm and Y1 to Yn, and may integrate the detected capacitance to output analog signals. First receivers XRX1 to XRXm may be connected to the first sensor lines X1 to Xm, respectively, and second receivers YRX1 to YRXn may be connected to the second sensor lines Y1 to Yn, respectively.

The signal converting unit 230 may digitally convert an analog signal output from the sensing unit 220 to generate a digital signal. A multiplexer (MUX), sequentially transmitting analog signals output from the plurality of receivers XRX1 to XRXm. and YRX1 to YRXn of the sensing unit 220 to the signal converting unit 230 may further be provided between the sensing unit 220 and the signal converting unit 230. The signal converting unit 230 may include: (1) a time-to-digital converter (TDC) circuit measuring a time at which an analog signal output from the sensing unit 220 in voltage form reaches a predetermined reference voltage level and (2) an analog-to-digital converter (ADC) circuit measuring an amount of change in a level of an analog signal output from the sensing unit 220 for a predetermined period of time. The signal processor 240 may determine the number of touch inputs applied to the touch panel 10, coordinates, gesture operations, and the like, using digital signals.

Figure 5:
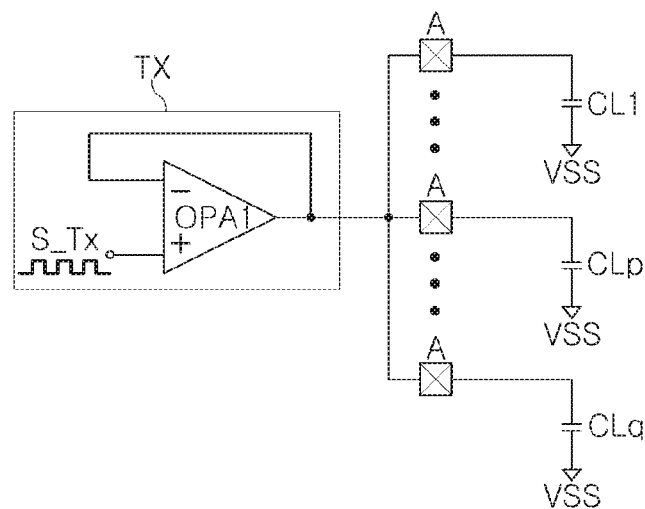
FIG. 5 illustrates a circuit diagram of a transmitter according to an example embodiment of the present disclosure.

FIG. 5 illustrates a circuit diagram of a transmitter according to an example embodiment.

The transmitter TX according to an example embodiment may be one of the first transmitter XTX and the second transmitter YTX. Line capacitors CL1 to CLq, where q is m or n, may correspond to capacitors having capacitances of the sensor line component described above.

Referring to FIGS. 4 and 5, for example, when the transmitter Tx corresponds to the first transmitter XTX, the line capacitors CL1 to CLq may be understood as capacitors having capacitance of the sensor line component by the first sensor lines X1 to Xm, and when the transmitter Tx corresponds to the second transmitter YTX, the line capacitors CL1 to CLq may be understood as capacitors having capacitance of the sensor line component by the second sensor lines Y1 to Ym.

The transmitter TX may simultaneously apply a driving signal S_Tx to the line capacitors CL1 to CLq. In detail, the transmitter TX may apply the drive signal S_Tx to one line capacitor CLp among the line capacitors CL1 to CLq, and may apply a driving signal S_Tx mirrored from the driving signal S_Tx to the remaining line capacitors CL1 to CLp−1 and CLp+1 to CLq. Levels of the driving signal S_Tx applied to one line capacitor CLp and the driving signal S_Tx applied to the remaining line capacitors CL1 to CLp−1 and CLp+1 to CLq may be equal to each other through mirroring. For example, mirroring a predetermined signal may be understood as copying or duplicating a predetermined signal as the same signal.

In order to perform the operations as described above, the transmitter TX may include a first operational amplifier OPA1 including a first input terminal, a second input terminal, and an output terminal. The first input terminal is provided with the driving signal S_Tx, the second input terminal is connected to the output terminal. The first input terminal of the first operational amplifier OPA1 may correspond to a non-inverting terminal, and the second input terminal may correspond to an inverting terminal. The output terminal of the first operational amplifier OPA1 may be respectively connected to the line capacitors CL1 to CLq. The first operational amplifier OPA1 may have a reference gain, and, for example, the reference gain may be '1'. Thus, the driving signal S_Tx input to the first input terminal of the first operational amplifier OPA1 may be provided to all of the line capacitors CL1 to CLq as the driving signal S_Tx. The line capacitors CL1 to CLq may be charged with the same charge by the driving signal S_Tx input to the line capacitors CL1 to CLq after mirroring thereof.

As described above, in the line capacitors CL1 to CLq, an offset due to a difference between capacitances of specific line capacitors and capacitances of other line capacitors may occur by a difference in areas, lengths, and the like, due to a process error in manufacturing the first and second sensor lines X1 to Xm and Y1 to Yn. Thus, even in the case in which the same level of driving signals S_Tx is provided to all of the line capacitors CL1 to CLq by the transmitter TX to charge the line capacitors with the same charge, levels of voltages of the line capacitors CL1 to CLq may be different from each other due to a difference in capacitance between the first and second sensor lines X1 to Xm and Y1-Yn.

Figure 6:
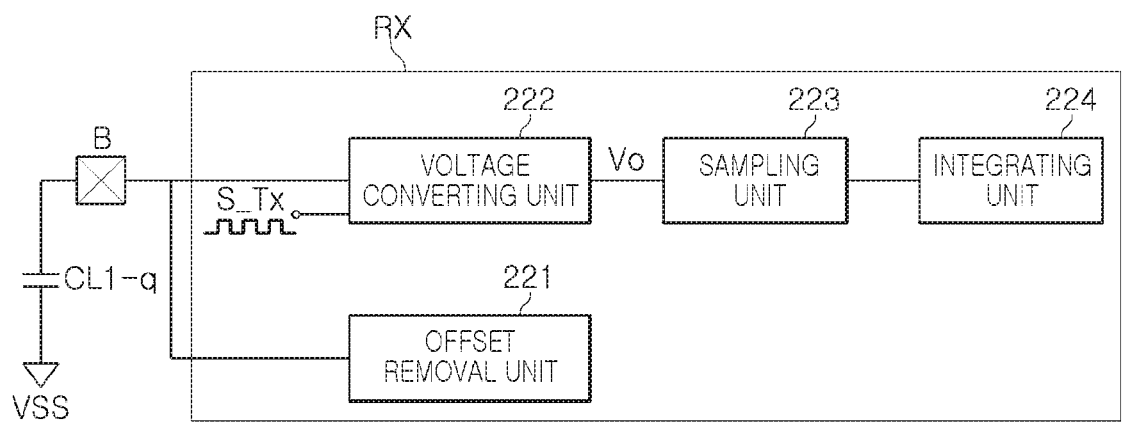
FIG. 6 illustrates a block diagram illustrating a receiver according to an example embodiment of the present disclosure.

FIG. 6 illustrates a block diagram illustrating a receiver according to an example embodiment.

With reference to FIGS. 4 and 6, a receiver RX according to an example embodiment may be one of first receivers XRX1 to XRXm and second receivers YRX1 to YRXn. The receiver RX may be provided as a plurality of receivers, and the plurality of receivers may be connected to line capacitors CL1 to CLq, respectively. The receiver RX may include an offset removal unit 221 and a voltage converting unit 222, and may further include a sampling unit 223 and an integrating unit 224.

The offset removal unit 221 may provide an offset signal to the line capacitors CL1 to CLq to eliminate a voltage offset corresponding to a voltage difference between the line capacitors CL1 to CLq. The offset removal unit 221 may eliminate a voltage offset by comparing a level of a reference voltage with levels of voltages of the line capacitors CL1 to CLq.

The reference voltage may be a voltage measured in one of the line capacitors CL1 to CLq. In this case, a reference line capacitor CLp of FIG. 5 may correspond to one capacitor for which a reference voltage is measured, and the reference line capacitor CLp may be understood as being implemented from a reference sensor line having an appropriate capacitance at the time of design. For example, a voltage of the reference line capacitor CLp charged by a charge of the drive signal S_Tx may have a voltage level identical to a level of voltage of the drive signal S_Tx.

The voltage converting unit 222 may include a C-V converter to convert capacitance obtained from the line capacitors CL1 to CLq into a voltage signal and may output the voltage signal. The driving signal S_Tx may be input to a first input terminal of the respective voltage converting unit 222, and the line capacitors CL1 to CLq of the touch panel 10 may be connected to respective second input terminals of the voltage converting units 222. The driving signal S_Tx input to the first input terminal of the respective voltage converting unit 222 may obtain a difference between voltages of the line capacitors CL1 to CLq connected to the second input terminals, to thus reduce capacitance of a feedback capacitor of the C-V converter outputting a voltage signal.

The sampling unit 223 may remove noise of a voltage signal provided from the voltage converting unit 222. For example, the sampling unit 223 may include a sample and hold amplifier (SHA). In detail, the sampling unit 223 may include a first SHA filter sampling a positive signal from the voltage signal and a second SHA filter sampling a negative signal from the voltage signal. The integrating unit 224 may integrate and output a sampled signal output from the sampling unit 223. For example, when the sampling unit 223 is implemented by the first SHA filter and the second SHA filter, differences between the sampled positive signals and the sampled negative signals may be accumulated.

Figure 7:
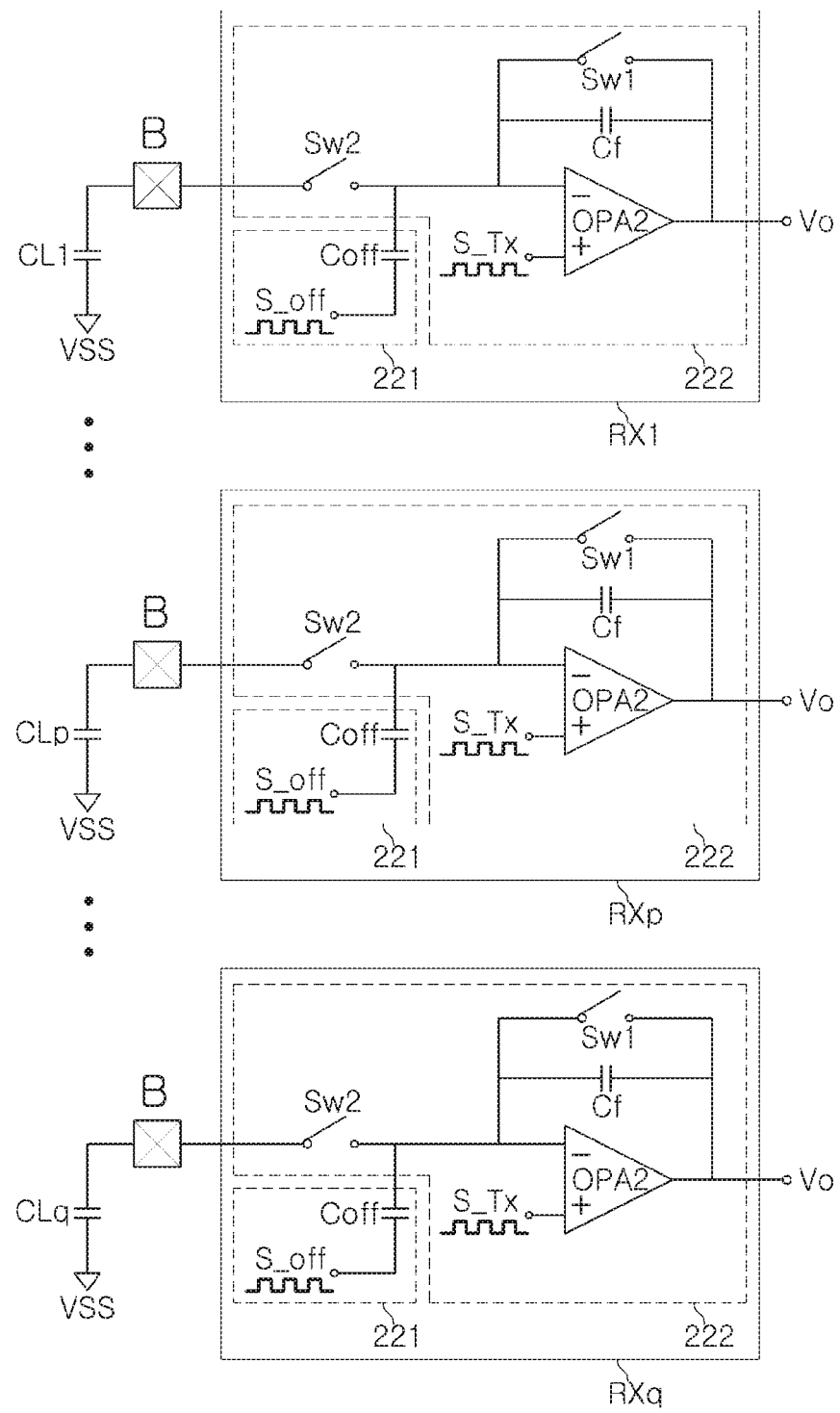
FIG. 7 illustrates a circuit diagram illustrating a main portion of the receiver of FIG. 6.

FIG. 7 illustrates a circuit diagram illustrating main portions of the receiver illustrated in FIG. 6. A plurality of receivers RX1 to RXq may be provided and may be connected to the line capacitors CL1 to CLq, respectively.

The offset removal unit 221 may include an offset capacitor Coff removing a voltage offset of the line capacitors CL1 to CLq. For example, when the same charge is charged in the line capacitors CL1 to CLq by the transmitter TX, since the voltage offset of the line capacitors CL1 to CLq is generated according to a difference in capacitance between the line capacitors CL1 to CLq, capacitance of the offset capacitor Coff may be determined by the difference in capacitance between the line capacitors CL1 to CLq. In detail, since the voltage offset is caused by a difference in capacitance between the reference line capacitor CLp and the remaining line capacitors CL1 to CLp−1 and CLp+1 to CLq, the capacitance of the offset capacitor Coff may be determined by a difference in capacitance between the reference line capacitor CLp and the remaining line capacitors CL1 to CLp−1 and CLp+1 to CLq. For example, the capacitance of the offset capacitor Coff may be determined as a maximum value of the difference in capacitance between the reference line capacitor CLp and the remaining line capacitors CL1 to CLp−1 and CLp+1 to CLq.

The offset removal unit 221 may provide an offset signal S_off to the offset capacitor Coff to remove a voltage offset between the reference line capacitor CLp and the line capacitors CL1 to CLq. Capacitance errors in a process of manufacturing sensor lines forming the line capacitors CL1 to CLq may be eliminated by the offset signal S_off. Since deviations in capacitance between the line capacitors CL1 to CLq are relatively low as compared with capacitance of the line capacitors CL1 to CLq, the offset signal S_off removing a voltage difference between the line capacitors CL1 to CLq may be a voltage signal having a relatively very low level.

Thus, since capacitance of the offset capacitor Coff to which the offset signal S_off is provided may be relatively low as compared with the capacitance of the line capacitors CL1 to CLq, the area and the volume of a device may be reduced while eliminating a voltage offset in the touch panel controller according to an example embodiment.

The voltage converting unit 222 may include a second operational amplifier OPA2, a feedback capacitor Cf, a first switch SW1, and a second switch SW2. A driving signal S_Tx may be input to a first input terminal of the second operational amplifier OPA2, and a second input terminal of the second operational amplifier OPA2 may be connected to an output terminal thereof through the feedback capacitor Cf and the first switch SW1 connected to each other in parallel. The first input terminal of the second operational amplifier OPA2 may correspond to a non-inverting terminal, and the second input terminal may correspond to an inverting terminal. The second switch SW2 may be disposed between the inverting terminal of the second operational amplifier OPA2 and a respective node B of the line capacitors CL1 to CLq, and the offset capacitor Coff of the offset removal unit 221 may be connected to a connection node between the second switch SW2 and the inverting terminal of the second operational amplifier OPA2.

Charge according to voltage of the line capacitors CL1 to CLq may be input to the inverting terminal of the second operational amplifier OPA2 through the second switch SW2 and may be transferred to the feedback capacitor Cf. Since capacitance of the line capacitors CL1 to CLq corresponds to capacitance of the signal component as described above or is much greater than capacitance of the signal component in a scheme in which a mesh-shaped conductor line is used as a sensor line, the feedback capacitor Cf may be saturated in the case in which the charge according to voltage of the line capacitors CL1 to CLq is transmitted as is to the feedback capacitor Cf. The voltage converting unit 222 according to an example embodiment may prevent the feedback capacitor Cf from being saturated and may only output capacitance provided by a signal component as a voltage signal Vo, by applying the driving signal S_Tx, the same signal as the signal charging the line capacitors CL1 to CLq in the transmitter TX, to the non-inverting terminal of the second operational amplifier OPA2. The voltage signal Vo output from the voltage converting unit 222 may be transmitted to the integrating unit 224 via the sampling unit 223 of FIG. 6, and the integrating unit 224 may accumulate the voltage signals Vo from the respective receivers RX1 to RXq, to calculate a change in capacitance.

Figure 10:
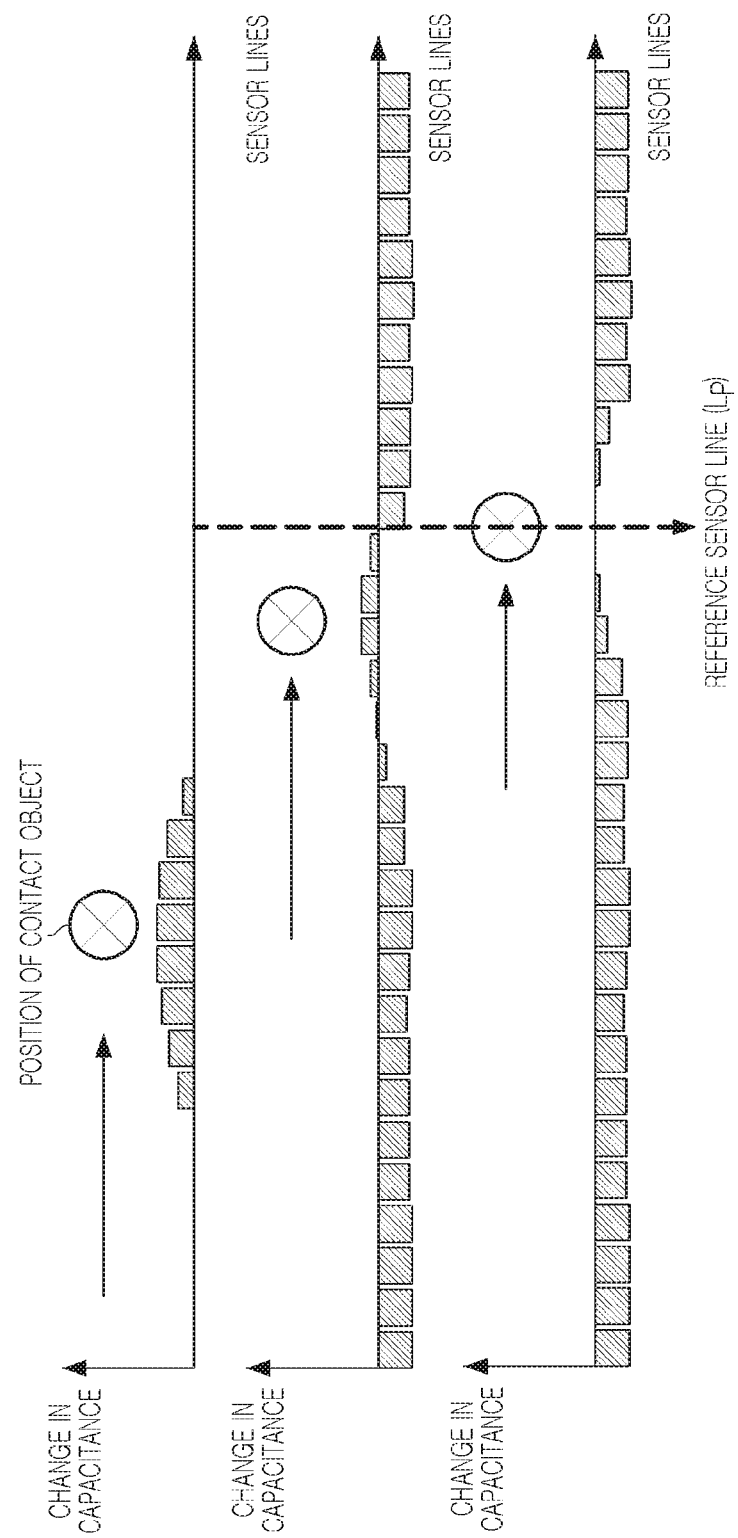
FIG. 10 illustrates a drawing illustrating a change in capacitance according to an example embodiment of the present disclosure.

FIG. 10 illustrates a drawing illustrating a change in capacitance according to an example embodiment. Hereinafter, a method of calculating a change in capacitance according to an example embodiment will be described with reference to FIGS. 6, 7, and 10.

The integrating unit 224 may calculate a change in capacitance, based on the voltage signal Vo output from the reference line capacitor CLp. For example, the integrating unit 224 may obtain a difference between the voltage signal Vo output from the reference line capacitor CLp and the voltage signals Vo output from the remaining line capacitors CL1 to CLp−1 and CLp+1 to CLq and then may integrate the signals, or may integrate the voltage signal Vo output from the reference line capacitor CLp and the voltage signals Vo output from the remaining line capacitors CL1 to CLp−1 and CLp+1 to CLq and then may obtain a difference therebetween, thereby calculating a change in capacitance. Thus, a distribution of capacitances of the remaining line capacitors CL1 to CLp−1 and CLp+1 to CLq, based on the reference line capacitor CLp, may be determined. Referring to FIG. 10, as a position of a contact object moves toward the right, a change value of a maximum capacitance moves to the right. However, as the position of the contact object approaches a reference sensor line Lp, the change value of the maximum capacitance may gradually decrease. Further, for example, when the contact object is located on the reference sensor line Lp, the change value of capacitance in the reference sensor line Lp may be represented as 0, and in the sensor line from which the contact object is relatively distant, the change value of capacitance may be a negative value.

According to an example embodiment, a driving signal may be simultaneously applied to the line capacitors CL1 to CLq, and a difference between the voltage signal Vo output from the reference line capacitor CLp and the voltage signals output from the remaining line capacitors CL1 to CLp−1 and CLp+1 to CLq may be obtained, to thus calculate a change in capacitance, thereby eliminating common noise flowing into the touch panel.

Figure 8:
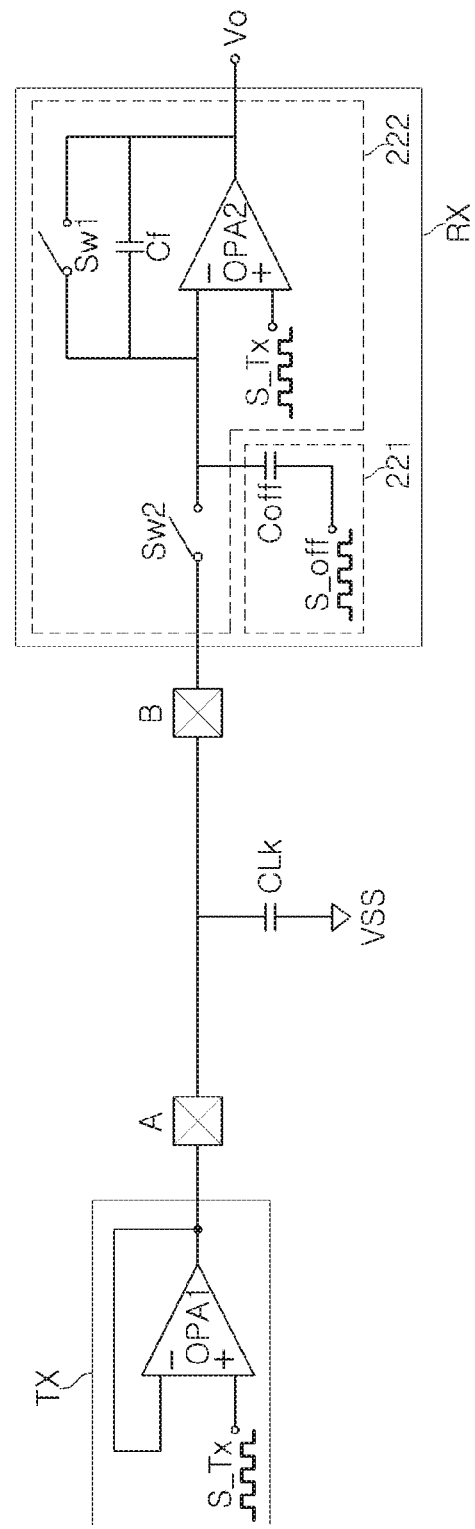
FIG. 8 illustrates a circuit diagram illustrating a transmitter and a receiver according to an example embodiment of the present disclosure.
Figure 9:
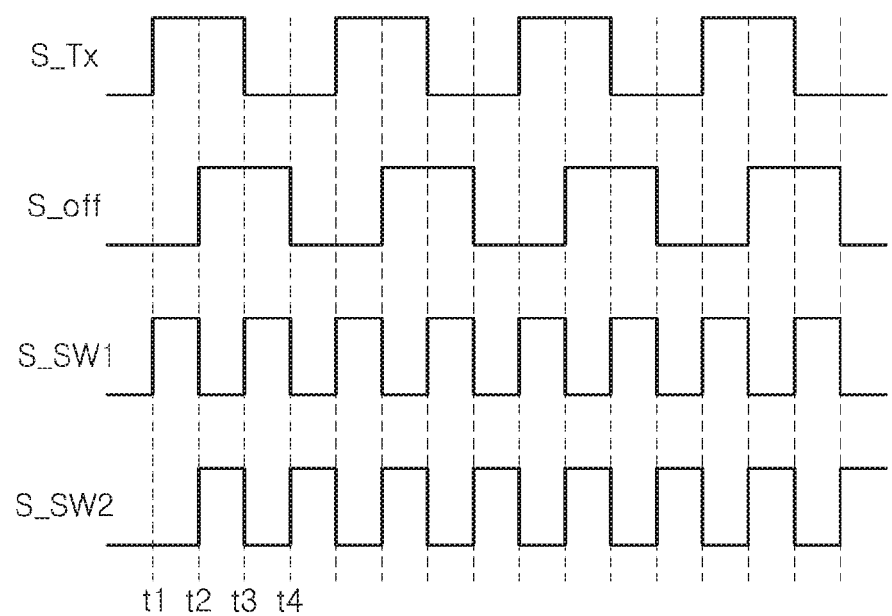
FIG. 9 illustrates waveform diagrams of signals provided to a transmitter and a receiver according to an example embodiment of the present disclosure.

FIG. 8 illustrates a circuit diagram illustrating a transmitter and a receiver according to an example embodiment, and FIG. 9 is a waveform diagram illustrating signals provided to a transmitter and a receiver according to an example embodiment. Hereinafter, operations of the transmitter and the receiver according to an example embodiment will be described in detail with reference to FIGS. 8 and 9.

At a point in time t1, the driving signal S_Tx may be activated, be input to a first node A of a line capacitor CLk, and be input to the non-inverting terminal of the second operational amplifier OPA2. Further, a first switch signal S_SW1 may be activated to thus turn the first switch SW1 on. The second operational amplifier OPA2 may be reset by the turned-on first switch SW1, and thus, the output terminal and the non-inverting terminal of the second operational amplifier OPA2 may have the same voltage level. Thus, the output terminal of the second operational amplifier OPA2 may have the same level as that of voltage of the driving signal S_Tx.

At a point in time t2, the driving signal S_Tx may be maintained in an activated state, to be input to the first node A of the line capacitor CLk and be input to the non-inverting terminal of the second operational amplifier OPA2. In addition, a second switch signal S_SW2 may be activated, to turn the second switch SW2 on, and the offset signal S_off may be activated and may be input to the offset capacitor Coff.

The voltage offset of the line capacitor CLk may be removed by the offset signal S_off. Further, the second operational amplifier OPA2 may perform a difference operation between a voltage of the line capacitor CLk from which the voltage offset input to the inverting terminal thereof has been removed, and a voltage of the driving signal S_Tx input to the non-inverting terminal thereof. Thus, a voltage of the output terminal of the second operational amplifier OPA2, of which a voltage level has fallen to a low level due to a turn-off operation of the first switch SW1, may be gradually increased by capacitance provided by a signal component.

At a point in time t3, as the first switch signal S_SW1 is activated, the first switch SW1 may be turned on. Thus, the output terminal of the second operational amplifier OPA2 may have the same voltage level as a voltage level of the low-level driving signal S_Tx. Further, the offset signal S_off may be activated and the offset signal S_off may be input to the offset capacitor Coff.

At a point in time t4, as the second switch signal S_SW2 is activated, the second switch SW2 may be turned on. The voltage of the output terminal of the second operational amplifier OPA2 may be gradually increased by capacitance provided by the signal component by a turn-on operation of the second switch SW2.

Figure 11:
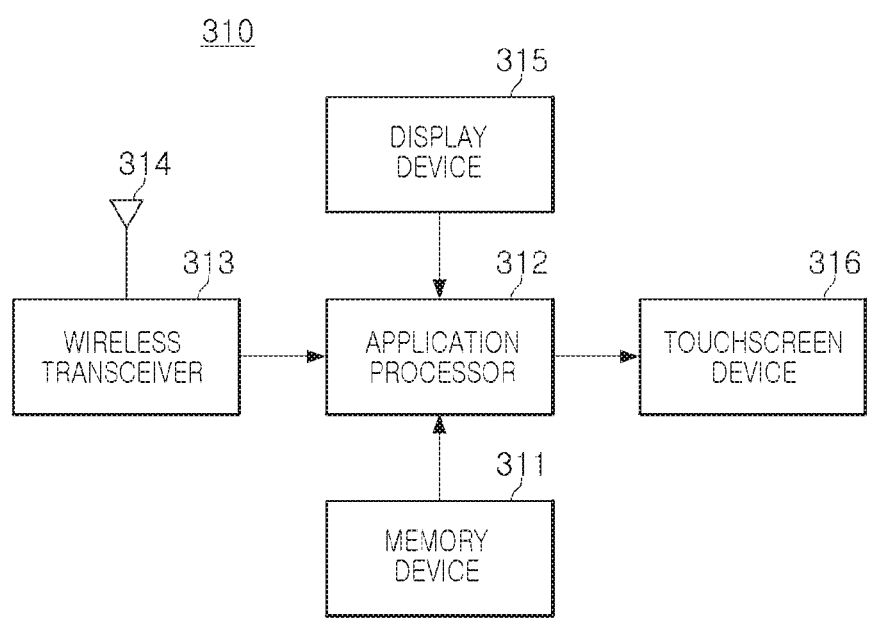
FIG. 11 illustrates a block diagram of a computer system employing a touchscreen device according to an example embodiment of the present disclosure.

FIG. 11 illustrates a block diagram illustrating an example of a computer system employing a touchscreen device according to an example embodiment.

With reference to FIG. 11, a computer system 310 may include a memory device 311, an application processor 312 including a memory controller controlling the memory device 311, a wireless transceiver 313, an antenna 314, a display device 315, and a touchscreen device 316.

The wireless transceiver 313 may provide or receive a wireless signal via the antenna 314. For example, the wireless transceiver 313 may modify the wireless signal received via the antenna 314 into a signal able to be processed in the application processor 312. Thus, the application processor 312 may process the signal output from the wireless transceiver 313, and may transmit the processed signal to the display device 315. In addition, the wireless transceiver 313 may modify the signal output from the application processor 312 into a wireless signal and may output the modified wireless signal to an external device via the antenna 314. The touchscreen device 316 may convert a touch input by a user into a capacitance change amount, and may convert information regarding the capacitance change amount into coordinate information. The touchscreen device 316 may transmit the coordinate information to the application processor 312.

As set forth above, according to an example embodiment, a difference detection operation between a signal provided to electrodes of a touch panel to detect a change in capacitance, and capacitance of electrodes may be obtained, thereby effectively removing capacitance of the electrode itself. In addition, the area and volume of a touch panel controller may be reduced by compensating for capacitance offset between electrodes, using a capacitor having a relatively low capacitance. Further, signals for the detection of a change in capacitance may be simultaneously applied to electrodes, and a difference of a signal obtained from one of the electrodes from signals obtained from the remaining electrodes may be obtained, thereby removing common noise flowing into a touch panel.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While example embodiments have been shown and described above, it will be apparent to those skilled in the art that modifications and variations could be made without departing from the scope of the present disclosure as defined by the appended claims.

What is claimed is:

1. A touch panel controller comprising:
   a signal driver charging a plurality of sensor lines extending in a direction, with a same charge by applying a first driving signal to one sensor line of the sensor lines and applying a mirrored driving signal mirrored from the first driving signal to remaining sensor lines of the sensor lines; and
   a sensor sensing a change in capacitance from each of the sensor lines, respectively, wherein:
   for each of the remaining sensor lines:
      the sensor eliminates a voltage offset from the remaining sensor line according to a difference between the capacitance of the one sensor line and the capacitance of the remaining sensor line, and
      the sensor determines the change in capacitance according to a difference between a voltage of the one sensor line and a voltage, from which the voltage offset has been eliminated, of the remaining sensor line.

2. The touch panel controller of claim 1, wherein the signal driver generating the mirrored driving signal by duplicating the first driving signal according to reference gain.

3. The touch panel controller of claim 1, wherein for each sensor line:
the signal driver comprises an operational amplifier including a first input terminal, a second input terminal, and an output terminal, and
for each operational amplifier, the first input terminal is provided with the first driving signal, the second input terminal is connected to the output terminal, and the output terminal is connected to the sensor line.

4. The touch panel controller of claim 1, wherein the sensor comprises an offset capacitor eliminating the voltage offset.

5. The touch panel controller of claim 4, wherein the capacitance of the offset capacitor is determined according to a maximum difference between the capacitance of the one sensor line and the capacitance of each of the remaining sensor lines.

6. The touch panel controller of claim 5, wherein the offset capacitor is provided with an offset signal and an activation period of the offset signal is overlapped with an activation period of the first driving signal, at least partially.

7. The touch panel controller of claim 1, further comprising a plurality of offset capacitors, each of the offset capacitors having:
a first terminal electrically connected to a different one of the sensor lines that offsets a difference in capacitance between the sensor line to which the offset capacitor is connected and one of the sensor lines selected as a reference sensor line, and
a second terminal that receives a second driving signal.

8. The touch panel controller of claim 7, wherein:
each of the first and second driving signals is a square wave, and
a phase of the second driving signal differs from that of the first driving signal by no more than 180 degrees within a single cycle of the first driving signal.

9. A touch panel controller comprising:
a signal driver that applies a first driving signal to a plurality of sensor lines extending in a direction; and
a sensor that senses a change in capacitance for each of the sensor lines by calculating a difference between a voltage of the sensor line and a voltage of the first driving signal, wherein:
for each of first sensor lines among the sensor lines:
the sensor eliminates a voltage offset from the first sensor line according to a difference between a capacitance of a second sensor line, among the sensor lines, and the capacitance of the first sensor line, and
the sensor calculates a difference between a voltage, from which the voltage offset has been removed, of the first sensor line and the voltage of the first driving signal.

10. The touch panel controller of claim 9, wherein for each of the sensor lines, the sensor eliminates capacitance from the sensor line by calculating the difference between the voltage of the sensor line and the voltage of the first driving signal.

11. The touch panel controller of claim 9, wherein:
the sensor comprises a plurality of voltage converters connected to the sensor lines, respectively, and
each of the voltage converters comprises an operational amplifier including a first input terminal to which the first driving signal is input and a second input terminal connected to one sensor line of the sensor lines.

12. The touch panel controller of claim 11, wherein:
each of the voltage converters further comprises a switch disposed between one of the sensor lines and the second input terminal, and
an activation period of a switching signal of the switch is overlapped with an activation period of the first driving signal, at least partially.

13. The touch panel controller of claim 9, wherein the signal driver charges the sensor lines with a same charge by simultaneously applying the first driving signal to the sensor lines.

14. The touch panel controller of claim 9, further comprising a plurality of offset capacitors, each of the offset capacitors having:
a first terminal electrically connected to a different one of the sensor lines that offsets a difference in capacitance between the sensor line to which the offset capacitor is connected and one of the sensor lines selected as a reference sensor line, and
a second terminal that receives a second driving signal.

15. The touch panel controller of claim 14, wherein:
each of the first and second driving signals is a square wave, and
a phase of the second driving signal differs from that of the first driving signal by no more than 180 degrees within a single cycle of the first driving signal.

16. A touch panel controller comprising:
a signal driver that charges a plurality of sensor lines with a same charge by applying a first driving signal to the sensor lines of a touch panel;
a sensor that, for each of the sensor lines, senses a difference between a voltage sensed on the sensor line and a voltage of the first driving signal; and
a plurality of offset capacitors, each offset capacitor having:
a first terminal, electrically connected to a different one of the sensor lines, that offsets a difference in capacitance between the sensor line to which the offset capacitor is connected and one of the sensor lines selected as a reference sensor line, and
a second terminal that receives a second driving signal.

17. The touch panel controller of claim 16, wherein each of the first and second driving signals is a time-varying and repeating signal.

18. The touch panel controller of claim 16, wherein:
each of the first and second driving signals is a square wave, and
a phase of the second driving signal differs from that of the first driving signal by no more than 180 degrees within a single cycle of the first driving signal.

19. The touch panel controller of claim 18, wherein for each sensor line, the sensor senses the difference between the voltage sensed on the sensor line and the voltage of the first driving signal only during a period in which the first and second driving signals have a same polarity.

20. The touch panel controller of claim 16, wherein the capacitance of each of the offset capacitors is determined according to a maximum difference between the capacitance of the reference sensor line and a capacitance of each remaining sensor line of the sensor lines.

* * * * *